Figure 1:
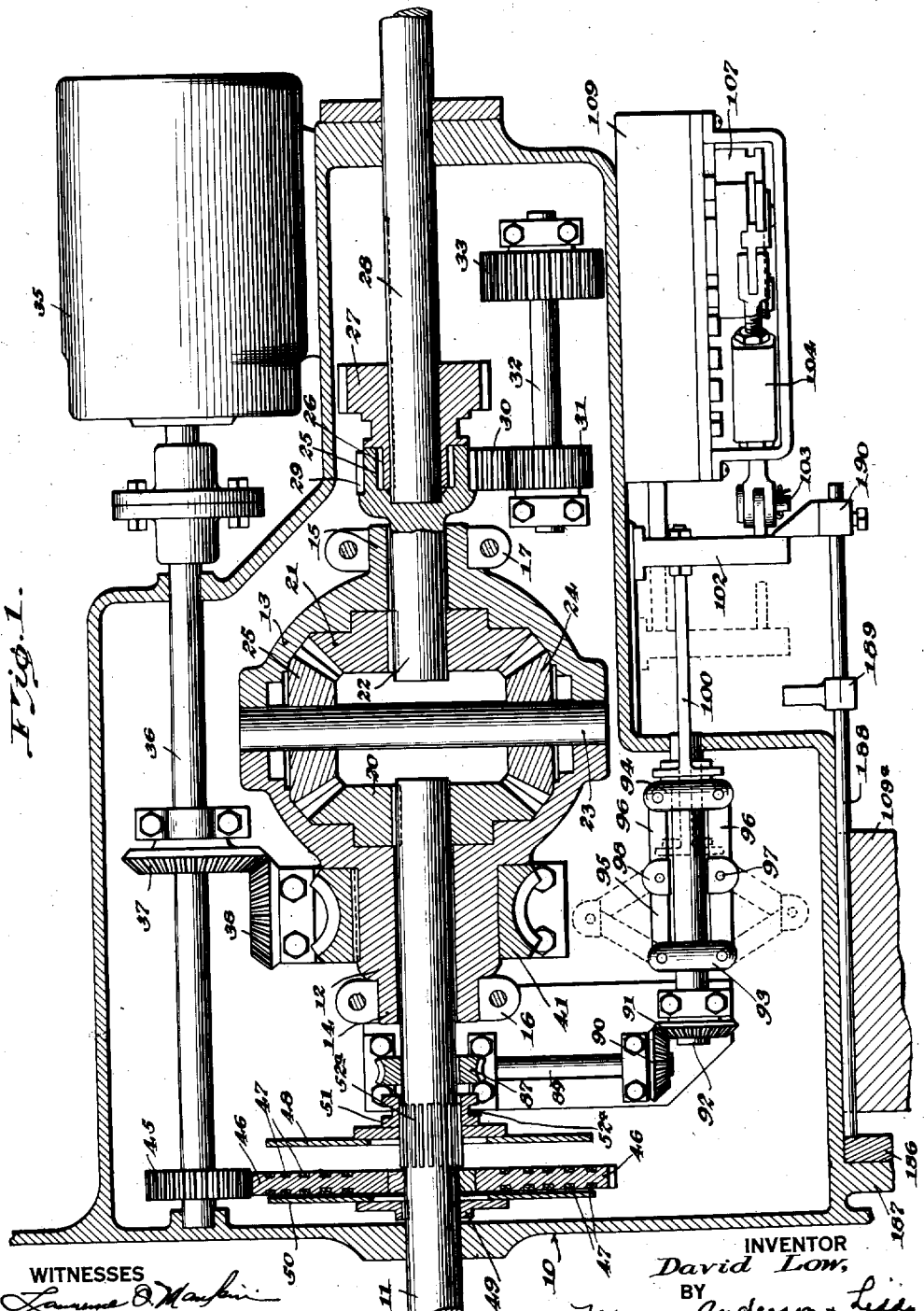

Oct. 29, 1935.　　　　　D. LOW　　　　　2,019,424
VARIABLE SPEED MECHANISM
Filed April 12, 1934　　　4 Sheets-Sheet 1

WITNESSES

INVENTOR
David Low,
BY
Munn, Anderson & Liddy
ATTORNEYS

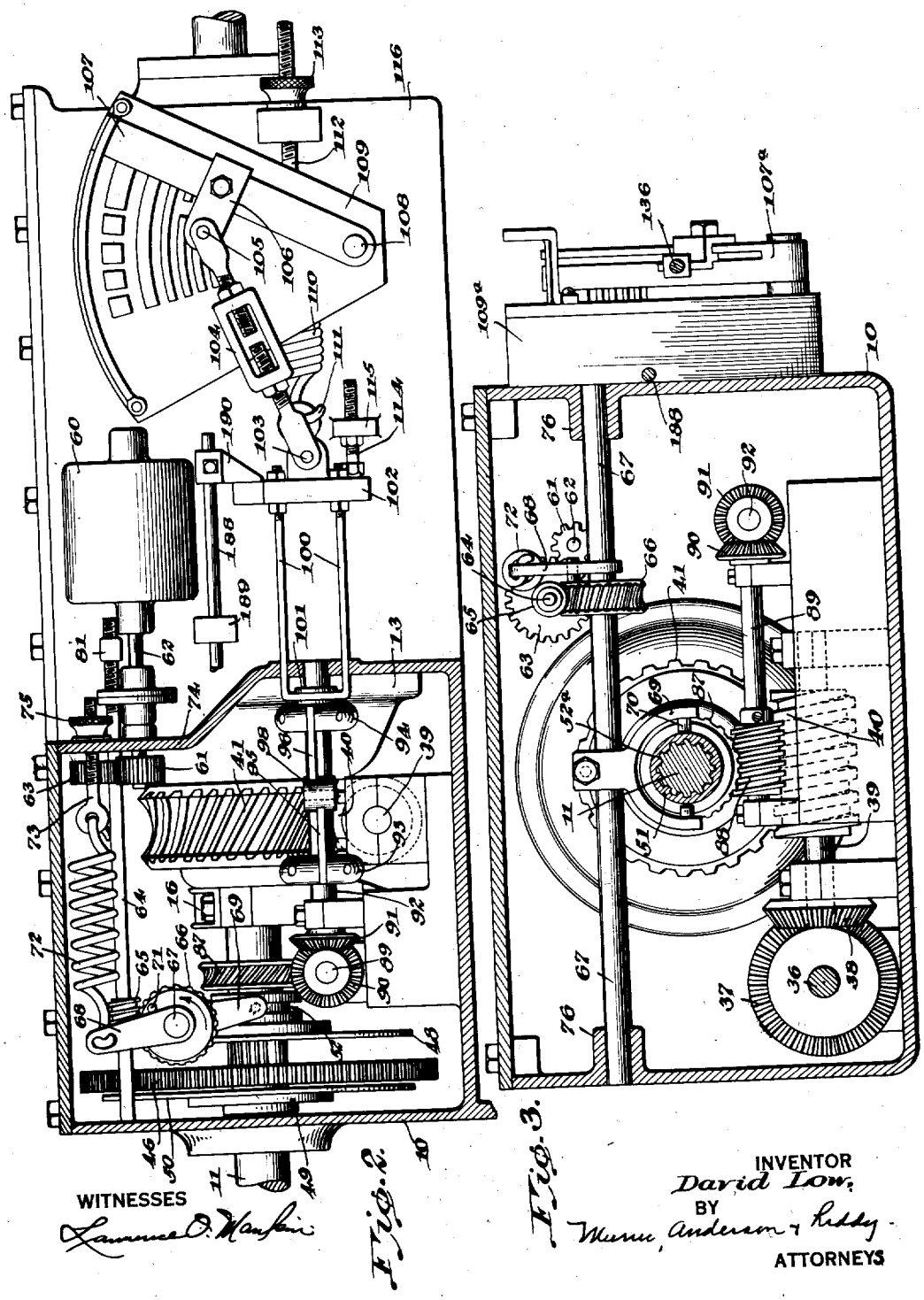

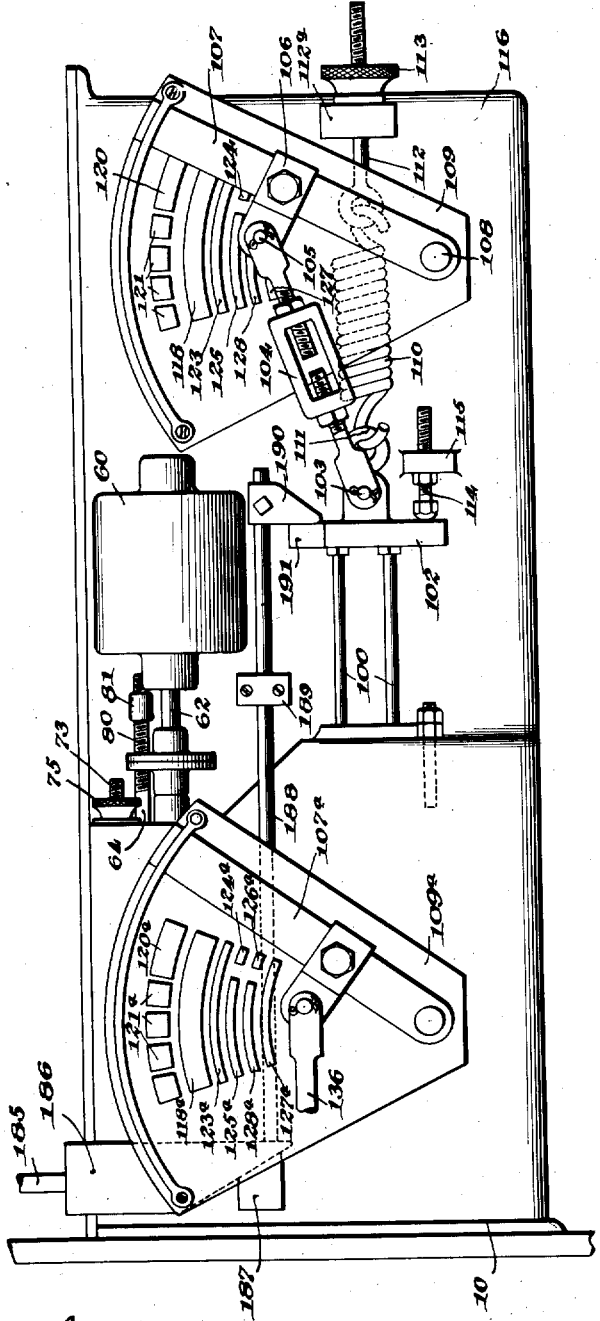

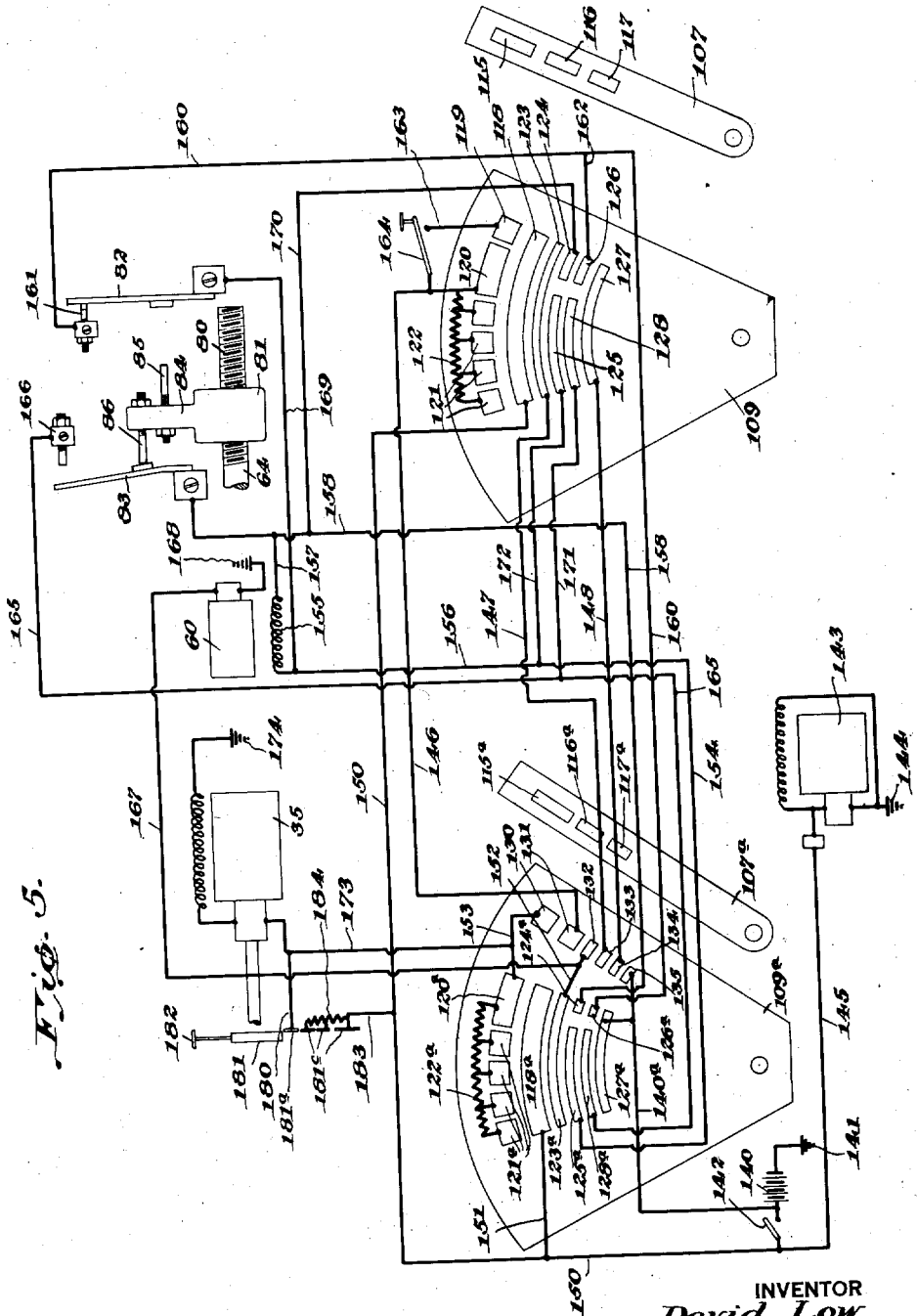

Patented Oct. 29, 1935

2,019,424

UNITED STATES PATENT OFFICE 2,019,424

VARIABLE SPEED MECHANISM

David Low, Asheville, N. C.

Application April 12, 1934, Serial No. 720,291

16 Claims. (Cl. 172—239)

This invention relates to a variable speed mechanism.

An object of the invention is the provision of a variable speed mechanism and an automatic device for controlling said mechanism, whereby the prime mover will be relieved of all load when the speed of the prime mover falls below a predetermined speed regardless of whether the speed reduction is caused by increased load or decreased power output.

Another object of the invention is the provision of a controlling device for variable speed mechanism in which the variable speed mechanism is automatically controlled in such a manner that the gear ratio between the prime mover and its load will be maintained at all times at the most effective ratio for the amount of load and the amount of power developed in any instant.

Another object of the invention is the provision of a variable speed mechanism for transmitting power from a drive shaft to a driven shaft in which an automatic regulator which is operated in accordance with the speed of the driven shaft may be instantly cut out and any desired speed ratio may be obtained by hand control, the device being so constructed that the hand control may be operated independently of the automatic control.

A further object of the invention is the provision of a variable speed mechanism in which an electric control motor is employed for rotating the drive shaft to start the prime mover with a clutch for maintaining the gear ratio at 1 to 0 at the time of starting.

A still further object of the invention is the provision of a variable speed mechanism having a manual control and an automatic control in which the automatic and manual control are adapted to place in operation a motor for controlling the connection between the starting motor and the drive shaft, the first-mentioned motor being operative only during starting and stopping.

A still further object of the invention is the provision of a variable speed mechanism controlled by a device which in turn is controlled by a mechanism which is operated in accordance with the speed of the drive shaft.

The invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a horizontal plan view of a variable speed mechanism constructed in accordance with the principles of my invention, Figure 2 is a vertical section of the same, Figure 3 is a transverse vertical section, Figure 4 is a side view in elevation of the variable speed mechanism, and Figure 5 is an electric wiring diagram showing the circuits for the control of the variable speed mechanism.

Referring more particularly to the drawings, 10 designates a transmission housing through which projects a drive shaft 11. This drive shaft is adapted to be connected to a prime mover such as an internal combustion engine (not shown) for operating the motor vehicle. This shaft extends inwardly of the housing and into an extension 12 of a differential casing 13, the ends of the housing shown at 14 and 15 being mounted respectively in bearings 16 and 17.

A gear 20 is located in the casing 13 and is keyed to the shaft 11. A similarly constructed gear 21 is located diametrically opposite the gear 20 and is keyed to a shaft 22 supported by the end 15 of the casing 13. A countershaft 23 is disposed in a plane at right angles to the plane passing through the shaft 11 and is mounted in bearings in the housing 13. Gears 24 and 25 are revolubly mounted on the shaft 23 and mesh with the gears 20 and 21.

A clutch member 25 formed integrally with the outer end of the shaft 22 is adapted to operatively engage a clutch member 26 on one end of the gear 27. The gear 27 is slidably keyed upon a shaft 28. The last-mentioned shaft is driven by the shaft 22 through the clutch elements 26. The particular form of clutch member 25 is provided with an external gear 29 which meshes with a gear 30 which in turn meshes with a gear 31 secured to a countershaft 32. A second gear 33 is also secured to the shaft 32 and the gear 27 is adapted to be moved into mesh with the gear 33 in any well known manner for providing a reverse drive on the shaft 28 since the direct drive between the shafts 22 and 28 is controlled by the clutch members 25 and 26 while the reverse drive is controlled through the transmission gear 29, 30 and 31 and the gears 27, 33 when the clutch element 26 has been released from the gear 25 and the gear 27 has been placed in mesh with the gear 33. The shaft 28 may be considered the driven shaft or the shaft which transmits motion to the rear wheels of the vehicle.

The electric motor 35 is connected to a shaft 36 extending through the housing 10 and has rigidly connected thereto a gear 37 meshing with a gear 38. The gear 38 is connected to a shaft 39 carrying a worm 40. This worm meshes with a worm wheel 41 secured to the extension 12 of the casing 13 so that when the motor 35 is operated the casing 13 will be revolved in one direction only and the casing will be held stationary when the motor is stopped due to the fact that the pitch of the worm 40 is such that the worm will prevent rotation of the worm gear 41.

The electric motor 35 is employed as a starting motor and revolves gear 45 which meshes with a gear 46 having a braking face 47 adapted to be engaged by a braking disc 48. A disc 49 is keyed to the shaft 11 and engages a braking disc 50 which engages the opposite braking face of the gear 46. The disc 48 is carried by a collar 51 having a groove 52 so that when this collar is shifted to the left in Fig. 1, the gear 46, which is ordinarily loose on the shaft 11, will be locked to said shaft. The collar 51 is slidably keyed, as shown at 52ª, on the shaft 11.

When the braking disc has been moved into operative relation with the gear 46 and the said gear is locked to the shaft 11, motor 35 may revolve the shaft 11 for starting the prime mover, not shown. The gear 37 drives the gear 38, the worm 40, the worm gear 41, and likewise the cage, or differential case 13 although the case is driven at one-half the speed of the shaft 11. Thus no motion will be transmitted to the shaft 28 through the gears 20, 21, 24, and 25 and the case 13. As soon as the clutch disc 48 is released from the gear 46 said gear will revolve idly on the shaft 11 when the motor 35 is being operated.

An electric motor 60, which I term the clutch motor in contradistinction to the gear or control motor 35, is adapted to revolve a gear 61 through a shaft 62. The gear 61, which is driven in a counterclockwise direction, revolves a second gear 63 secured to a shaft 64. This shaft is provided with a worm 65 meshing with a worm gear 66 which is driven in an anti-clockwise direction as shown by the arrow in Fig. 2.

The worm gear 66 is loose on a shaft 67. An arm 68 is rigidly connected with the shaft 67 as is a yolk 69. This yolk carries pins 70 which engage the groove 52 of the collar 51. A pin 71 projects laterally from the worm gear 66 and engages the arm 68 for moving said arm to the left, as shown in Fig. 2, thereby rocking the arm 69 to the right and moving the clutch disc 48 away from the gear 46, thus disconnecting the gear 46 from the shaft 11.

A coil spring 72 has one end attached to the upper end of the arm 68 while the other end of the spring is connected to a screw 73 carried by a partition 74 of the housing 10. A nut 75 is adapted to longitudinally position the screw 73 of the casing for varying the tension on the spring 72.

In Fig. 3 it will be seen that the shaft 67 extends transversely of the housing 10 and is mounted in bearings 76 formed on the side walls of said housing.

The shaft 64, as shown more particularly in Figs. 2, 4, and 5, is threaded at 80 and receives a nut 81 which is maintained against rotation in any approved manner so that when the shaft 64 is revolved the nut will be moved longitudinally of the casing for operating either one of a pair of switches 82 and 83. For this purpose the nut 81 is provided with an extension 84 carrying studs 85 and 86 adapted to respectively engage the movable switch arms 82 and 83 for a purpose which will be presently explained.

The shaft 11 is provided with a worm gear 87 adapted to mesh with a worm 88 connected with shaft 89. This shaft carries a gear 90 in mesh with a gear 91 on a shaft 92.

A governor is operatively connected with the shaft 92 and this governor consists of a fixed collar 93 and a movable collar 94.

A pair of arms 95 are pivotally connected with the collar 93 while a pair of arms 96 are pivotally connected with the collar 94. The inner ends of the arms 95 and 96 are pivotally connected at 97 with weights 98 which are adapted to swing outwardly from the shaft 92 and move the collar 94 to the left in Fig. 1 and towards the collar 93 when the shaft 92 is revolved at a predetermined speed, as shown in dotted lines in Fig. 1.

A yoke 100 is connected to a sleeve 101 which in turn is secured to the collar 94 so that as the collar is reciprocated the yolk will likewise be reciprocated and reciprocate a cross head 102. This cross head is connected at 103 with a link in the form of a turnbuckle 104 and the link is likewise connected at 105 to a plate 106 having connection with a movable arm 107 pivoted at 108 on a control board 109 which is secured to one side face of the housing 10.

A spring 110 is connected at 111 to the cross head 102 while the opposite end of the spring is carried by a bolt 112 maintained in a predetermined position by a nut 113 threaded onto the outer end of the bolt, said bolt passing through a lug 112ª attached to the rear end wall of the housing 10.

The spring 110 will tend to move the yoke 100 and likewise the collar 94 to the right, as shown in Fig. 2, and maintain the governor in an inoperative position after the speed of the shaft 92 has been reduced sufficiently. A stop 114 is threaded into a lug 115 formed upon one face 116 of the housing 10. This bolt is adjustable in order to properly position the cross head when the governor is in inoperative position due to the action of the spring 110.

As shown more particularly in Figs. 4 and 5, a pair of control boards 109 and 109ª are provided over which are adapted to oscillate respective arms 107 and 107ª. The arm 107 is provided with contact plates 115, 116 and 117. The plate 115 is adapted to not only engage the contact plate 118 on the board 109 but also the contacts 119, 120 and a plurality of contacts 121 which are connected with a plurality of resistance units 122. The contact plate 116 is adapted to connect the plates 123 and 124 and also adapted to connect the plate 123 with the plate 125. The contact member 117 is adapted to connect the contacts 126 and 127 and a contact plate 128 likewise with contact plate 127. The contact plates shown on the control board 109 are connected therewith in any approved manner. The control board 109ª is supplied with a similar number of contacts and these contacts are all indicated by similar numerals in connection with the letter a. The control board 109ª is provided with contact members 130 to 135, inclusive.

It will be noted that a space is provided between the series of contacts 130 to 135, inclusive, and the adjacently disposed contacts on the control board 109ª for a purpose which will be presently explained.

The movable arm 107ª, as shown in Fig. 4, is connected by a rod 136 to a hand lever conveniently placed near the steering wheel so that the operator of the motor vehicle may readily oscillate the member 107ᵃ remotely from his position. It will be noted that the arm 107ᵃ is oscillated independently of the arm 107 so that if there is any functional disturbance in the automatic control of the arm 107, the governor or the various parts to be presently described the manually controlled member 107ᵃ may be oscillated without in any way disturbing the automatic control of the arm 107 and vice versa.

Referring more particularly to Fig. 5 it will be seen that a battery 140 is provided and is grounded at 141 and controlled by a switch 142. A generator 143 of the usual type is grounded at 144 and connected by a wire 145 and a switch 142 to the battery 140.

The wires connecting the various contacts of the control board 109ᵃ with the control board 109 for alternate operation of the two controls will now be described.

A wire 146 connects the contact plate 131 with the contact plate 120. A wire 147 connects the contact 133 with the contact 123. A wire 148 connects the contact 134 with the contact 127. Contact 135 is connected to the battery 140.

A wire 150 connects the battery 140 through the switch 142 with the contacts 118 and this wire is also connected by a wire 151 to the contact 118ᵃ. The contact 123ᵃ is connected by a wire 152 with the contact 132. A wire 153 connects the contact 120ᵃ with the contact 130. A wire 154 and a wire 172 connect the contact 125ᵃ with the contact 125. The wires 154 and 172 are connected to the reversing field 155 of the motor 60 by means of a wire 156 and this field is connected by means of a wire 157 to a wire 158 which in turn is connected to the contact 124ᵃ. A wire 160 connects the contact 126ᵃ with a switch element 161 and a wire 162 connects the wire 160 with the contact 126. It will be noted that the wire 150 is extended and connected with the contact 118 which is connected by contact member 115 with the contact 119. This contact is connected by a wire 163 with a starting switch 164. This starting switch is also connected with the wire 146 and with the contact 120.

A wire 165 connects the contact 128ᵃ with a switch element 166 which is adapted to be engaged by the movable arm 83 of the switch element for closing a circuit which will be presently described.

The wire 152 which connects the contacts 132 with the contact 123ᵃ of the control board 109ᵃ is connected by a wire 167 to the motor 60 which is grounded at 168.

A wire 169 connects the field coil 155 of the motor 60 with the movable switch arm 82 while a wire 170 is connected to the wire 158 which in turn is connected to the switch arm 83. The wire 170 is connected with the contact member 124 of the control board 109. It will be noted that the wire 165 is connected by a wire 171 with the contact 128. A wire 172 connects the wire 156 with the contact 125.

A wire 173 connects the wire 153 with a motor 35 and this motor is connected with the ground, as shown at 174.

The arm 107ᵃ is provided with similarly positioned contact members 115ᵃ, 116ᵃ and 117ᵃ.

A braking pedal 182 to which is attached a sliding contact 181 will if depressed cause said contact to make connection with a fixed contact plate 181ᵃ which through the wire 180 is connected to wire 173 and any of the fixed contacts 181ᶜ which are connected to various points of the resistance 184 which is connected to wire 183 to wire 150 and therefore to contact plates 118 and 118ᵃ.

Operation of the brake pedal at any time while the car is in motion to produce a braking effect will start the control motor 35 or increase its speed since the circuit is completed to the motor upon the depression of the pedal 182 through the battery 140, wires 150 and 183, resistance 184, one of the series of plates 181ᶜ, sliding contact 181, fixed plate 181ᵃ and wires 180 and 173 to motor 35 and the ground 174.

This will start motor 35 and give the same effect to the car as may be obtained usually by going into second gear on a hill except that with this mechanism the effect may be varied at the will of the operator.

A rod 185 is connected with an accelerator pedal (not shown) and with a cam member 186 which is adapted to engage a cam member 187 connected with one end of a rod 188 slidably mounted in bearings 189. This rod is provided with a toe 190 which is adapted to engage a finger 191 on the cross head 102 for automatically moving the arm 107 across certain of the contacts on the control board 109 for a purpose which will be presently explained.

The operation of the device is as follows: All of the parts are shown in an operative position. When the shaft 11 is idling and the arm 107ᵃ is in engagement with contacts 130 to 135 the clutch member 48 is closed and remains closed until the arm 107 moves to the left and engages contacts 123, 125 and contacts 126, 127, when the clutch member 48 opens or moves away from the gear 46. In other words, the arm 107ᵃ must be in this position in order to provide for the automatic operation or control of the variable speed mechanism through the arm 107 which is controlled by the governor and the speed of the shaft 11.

When the starter switch 164 is closed and the contact 115 is bridging the contacts 118 and 119, current from the battery 140 after the ignition switch (not shown) and switch 142 have been closed will flow through wire 150, contacts 118 and 119, through wire 146 and across contacts 131 and 130 through wires 153 and 173 to the motor 35 and to the ground 174. The motor 35 will then be revolved and the motor 60 will likewise be revolved in a manner to be explained. Switch 142 is normally kept closed but may be opened if it is desired to operate motor 35 directly from the generator 143 without the battery through the intermediary of wire 150, contacts 120, 118, 115, wire 146, contacts 115ᵃ, 130 131, wire 173 and the ground.

It will be borne in mind that when the vehicle has stopped, the clutch has been moved to an operative position with respect to the gear 46 so that when the motor 35 is started the shaft 11 will be connected to the motor for direct operation and the motor 60 is only used at the time of the starting or stopping of the vehicle. In other words, the motor 60 is only employed for releasing the clutch disc 48 and the engine when the vehicle is started and for moving the clutch disc back to an operative position with the gear 46 when the vehicle has stopped.

Referring to Fig. 5 it will be seen that the movable contact arm 82 is in contact with the member 161 for starting the motor 60. When the motor 35 is started and the arms 107 and 107ᵃ are in the proper position for starting as previously described, current will flow from the battery 140 through the wire 140ᵃ to the contacts 135, 117ᵃ, 134, wire 148, contact 127, contact 117, contact 126, wires 162 and 160, switch elements 161, 82, wire 169, through the reversing field coil 155, wires 157, 170, contacts 124, 116 and 123, through wire 147, contact 133, 116ᵃ, 132, wire 167, through the armature of the motor 60 to the ground 168, thereby completing the circuit to the motor 60 and this motor will run in the proper direction to close the clutch and so that the nut 81 will be moved to the right in Fig. 5 and the bolt 85 will engage the arm 82 and open the circuit to the motor 60 and thus stop said motor and when the clutch is closed.

The shaft 62 will revolve through the motor 60 and rotate the shaft 64, the worm 65 and the worm gear 66 with the worm gear being revolved in the opposite direction from the arrow indicated in Fig. 2. When this occurs the pin 71 will move away from the arm 68 to permit the spring 72 to move the arm to the right in Fig. 2 and the arm 69 to the left, thereby moving the clutch disc 48 into operative relation with the gear 46 so that the shaft 11 will be revolved by the motor 35. During this time the nut 81 has been moved to the right in Fig. 5 which moves the arm 82 and opens the switch, thereby breaking the circuit to the motor 60 while permitting the arm 83 to be moved into engagement with the contact member 166.

As soon as the power plant begins to operate under its own power, the shaft 11 will be driven by the power plant and in the same direction as the rotating motor 35. When the shaft has reached a predetermined speed, the governor will be operated and cause the weights 98 to be moved outwardly, whereby the cross head 102 will through the link 104 pull on the arm 107 and move it to a position where the contact 115 will bridge the contacts 120 and 118 while the contacts 116 and 117 will be in alignment with the space between the contacts 124, 125, 126, and 128.

In this position of the arm 107 contact 115 connects the contacts 120 and 118 of the control board 109 so that current from the battery 140 will pass through the motor 35 by way of the wires 146, contacts 131, 115ᵃ, and 130, wires 153 and 173 and ground, through the battery and wire 150 completing the circuit to the contact 118. Thus it will be seen that the motor 35 is maintained in operation.

As the engine speeds, however, due to the opening of the throttle, the increased speed of shaft 11 is transmitted to the governor shaft and the governor moves the arm 107 to the left in Fig. 5 so that the contact 115 will bridge the contacts 120 and 121, thereby maintaining the circuit to motor 35 closed. Further movement to the left will cause contact 116 to bridge contacts 123 and 125 and contact 117 to bridge 127 and 128 completing the circuit to motor 60 so that it will operate in such a manner to give a reverse motion to shaft 64 and the worm gear 66 so that the pin 71 will engage the arm 68 and release the clutch disc 48 so that the motor 35 is disconnected from the shaft 11. When this occurs the nut 81 is moved from its last position and the circuit through the movable member 83 and the switch element 116 will be broken to the motor, thereby causing stoppage of the motor 60 and the clutch is retained in released position due to the fact that the worm 65 locks the worm gear 66 against reverse rotation.

The function of the cam devices 186, 187 and 190 is to provide for a more positive action during starting since the operation of these cams by means of the accelerator pedal will move arm 107 through several positions of the contacts on control board 109 without waiting for the action of the governor. The principal use, however, of the cam control is to eliminate the need for close adjustment.

As the engine speeds up and the shaft 11 has an increased speed of rotation, the arm 107 is moved far to the left in Fig. 5 so that contact 115 bridges successively the contacts 121 and 118 thereby still maintaining the circuit closed to the motor 35 but since the current is reduced by the successive resistances 122, the speed of the motor 35 will be reduced and therefore the differential casing 13 to provide the intermediate speeds between low and high speeds. As the speed of casing 13 is gradually reduced, each successive reduction increases the difference between one-half the speed of shaft 11 and the speed of casing 13 which causes the speed of the driven shaft 22 to increase in its relation to the speed of the driving shaft 11 with each successive step and gradually approach a speed ratio of 1 to 1 between the driving and driven shafts.

When the last contact 121 is reached by the arm 107 the current to the motor 35 passes through all the sections of the resistance 122 and the speed of the motor has been greatly reduced. This reduces the speed of the casing 13 to a very low point and the speed ratio between the drive shaft 11 and the driven shaft 22 approaches very close to 1 to 1. When the arm 107 reaches its extreme left hand position, all circuits are open and the motor 35 stops and the speed ratio will be 1 to 1. This condition will be maintained as long as the casing 13 is held against rotation and this is regardless of the increased speed of revolution of the shaft 11.

The contacts 127 and 128 are bridged during this time by the contacts 117 of the arm 107 and the contacts 125 and 123 are bridged by the contact 116. The first-mentioned contacts close the portion of the circuit to the motor 60 while the bridging contacts 125, 123 are in the circuit with the switch elements 83 and 166. Thus it will be seen that the arrangement of the circuit is such in connection with the various contacts that the motor 60 is adapted to be operated for operating clutch disc 48 to either close or open the same, depending upon the conditions of the operation of the engine.

When the speed of the engine is reduced to below what I term the high gear ratio speed, the governor loses speed and power and spring 110 will move the arms of the governor towards the inward position and therefore the arm 107 will move towards its normal inoperative position and the reverse sequence of events will be had. As the speed of the engine continues to reduce and the arm 107 moves to the right, motor 35 is started as contact 115 again bridges contacts 118 and 121 and as further movement successively cuts out sections of resistance 122 the speed of motor 35 increases bringing the speed of casing 13 closer to one-half that of shaft 11 and lowering the speed of the driven shaft in relation to the speed of the driving shaft. When arm 107 reaches the point where the member 115 bridges the contacts 118 and 120, the speed of the case 13 is very close to one-half the speed of shaft 11 and speed of shaft 22 is very low. Still further movement to the right causes contact 116 to bridge contacts 123 and 124, and contact 117 to bridge contacts 126 and 127 causing motor 60 to start in the proper direction of rotation to close the clutch. When the clutch closes, the mechanical drive governs the speed of casing 13 so that it must be exactly one-half of the speed of shaft 11 and the vehicle stops. Still further movement of the arm 107 brings contact 115 onto contact 119 which acts as a blank (when starting switch is open) disconnecting motor 35 which continues to be mechanically driven as long as engine remains at idling speed.

When the motor vehicle is standing still and the engine is running at idling speed, the parts are so arranged that the shaft 11 through the clutch and gears 46 and 45 will drive shaft 36, also the electrically disconnected motor 35 at a speed which will drive the differential case 13, through gears 37, 38, shaft 39, worm 40 and worm gear 41, at a speed equal to one-half that of the shaft 11 so that no power will be transmitted through the differential to the driven shaft.

The manually operated control board 109ª and the arm 107ª gives the same results as the movable arm 107 over the control board 109. It will be noted, however, that the control board 109ª is supplied with the contacts 130 to 135, inclusive, and the arm 107ª must register with these radially aligned contacts when the automatic device is in operation.

The space between the radially aligned contacts 130 to 135, inclusive, and the next succeeding group of contacts on the control board 109ª provides a neutral point for the arm 107ª whereby the automatic control panel will be disconnected when the manually operated device is being employed.

As has been previously described, the contacts 120ª, 121ª and the co-ordinated contacts below the first-mentioned contacts are all connected with similarly numbered contacts on the control board 109 so that when the arms are moved in the same direction identical results will be had in the control of the differential.

I claim:—

1. In a variable speed mechanism, a drive shaft and a driven shaft, a differential connecting said shafts, a casing enclosing the differential and connected therewith, an electric control motor, means operatively connecting the motor with the casing so that the casing may be revolved by the motor at a less speed than the driving shaft, means for causing a gradually decreasing speed of the motor and likewise the casing for causing a gradually increasing speed of the driven shaft, and means including a second motor for causing the first-mentioned motor to be disconnected from or connected with the drive shaft.

2. In a variable speed mechanism, a drive shaft, a driven shaft, a differential connecting the drive shaft with the driven shaft, means for causing the differential to provide a variable speed between the drive shaft and the driven shaft, and including a casing housing said differential and connected to an element of the differential, an electric control motor, means operatively connecting the motor with the casing, and means for causing the speed of the motor to decrease in accordance with an increase of speed of the drive shaft for causing the differential and casing to rotate the driven shaft from the drive shaft.

3. In a variable speed mechanism, a drive shaft, a driven shaft, a differential connecting the drive shaft with the driven shaft, means for causing the differential to provide a variable speed between the drive shaft and the driven shaft and including a casing housing said differential and connected to an element of the differential, an electric control motor, means operatively connecting the motor with the casing, means for causing the speed of the motor to decrease in accordance with an increase of speed of the drive shaft for causing the differential and casing to rotate the driven shaft from the drive shaft, means for operatively connecting the motor to the drive shaft, and means for causing the last-mentioned means to be moved to an inoperative position when a predetermined speed of the drive shaft has been reached.

4. In a variable speed mechanism, a drive shaft, a driven shaft, a differential connecting the drive shaft with the driven shaft, means for causing the differential to provide a variable speed between the drive shaft and the driven shaft, and including a casing housing said differential and connected to an element of the differential, an electric control motor, means operatively connecting the motor with the casing, means for causing the speed of the motor to decrease in accordance with an increase of speed of the drive shaft for causing the differential and casing to rotate the driven shaft from the drive shaft, means for operatively connecting the motor to the drive shaft or disconnecting the motor from the drive shaft, and an electric motor for controlling the operation of the last mentioned means at a predetermined speed of the drive shaft.

5. In a variable speed mechanism, a drive shaft, a driven shaft, a differential connecting the drive shaft with the driven shaft, means for causing the differential to provide a variable speed between the drive shaft and driven shaft and comprising a revolving means carrying an element of the transmission and adapted to be rotated at a different speed from the drive shaft, an electric control motor, means operatively connecting the control motor with the revolving means, means including a second motor for disconnecting and connecting the control motor with the drive shaft, means for controlling the last mentioned means, and means operatively connected with the controlling means for controlling the speed of the motor control.

6. In a variable speed mechanism, a drive shaft, a driven shaft, a differential including a casing connecting said shafts, a motor for causing rotation of the casing at variable speeds relative to the drive shaft for causing relative speeds between the drive and driven shafts, a governor driven by the drive shaft, an electric circuit including a multi-stage resistor and the motor and a movable means for the resistor connected with the governor for progressively cutting down the current to the motor and decreasing the speed of rotation of the casing as the speed of rotation of the drive shaft is increased.

7. In a variable speed mechanism, a drive shaft, a driven shaft, a differential including a casing connecting said shafts, a motor for causing rotation of the casing at variable speeds relative to the drive shaft for causing relative speeds between the drive and driven shafts, a governor operated by the drive shaft, an electric circuit including a multi-stage resistor and the motor, and movable means actuated by the governor and cooperating with the resistor for varying the current to the motor.

8. In a variable speed mechanism, a drive shaft, a driven shaft, a differential including a casing connecting said shafts, a motor for causing rotation of the casing at variable speeds relative to the drive shaft for causing relative speeds between the drive and driven shafts, a governor operated by the drive shaft, an electric circuit including a multi-stage resistor and the motor, a movable means actuated by the governor and cooperating with the resistor for varying the current to the motor, a clutch for connecting the motor to the drive shaft temporarily, and means for controlling the movements of the clutch.

9. In a variable speed mechanism, a drive shaft, a driven shaft, a differential including a casing connecting said shafts, a motor for causing rotation of the casing at variable speeds relative to the drive shaft for causing relative speeds between the drive and driven shafts, a governor operated by the drive shaft, an electric circuit including a multi-stage resistor and the motor, a movable means actuated by the governor and cooperating with the resistor for varying the current to the motor, a clutch for connecting or disconnecting the motor from the drive shaft, a clutch motor for moving the clutch to open position, an open circuit including the clutch motor, a pair of switches cooperating to close the circuit, and means operated by the clutch motor for controlling one of the switches, and a movable arm connected to the governor for controlling the remaining switch to complete closing of the circuit.

10. In a variable speed mechanism, a drive shaft, a driven shaft, a differential including a casing connecting said shafts, an electric motor for causing rotation of the casing at variable speeds relative to the drive shaft for causing relative speeds between the drive and driven shafts, a governor operated by the drive shaft, a starting switch, a controlling switch, an electric circuit including the motor, the starting switch and the controlling switch, the last mentioned switch including a movable arm connected to the governor, a plurality of contacts adapted to be bridged by the movable arm and included in the circuit so that when the controlling switch and starting switch are closed the circuit to the motor will be closed, and means for causing the motor to be temporarily connected with the drive shaft to cause rotation of said shaft.

11. In a variable speed mechanism, a drive shaft, a driven shaft, a differential including a casing connecting said shafts, a motor for causing rotation of the casing at variable speeds relative to the drive shaft for causing relative speeds between the drive and driven shafts, a governor operated by the drive shaft, a variable resistor, an electric circuit including the motor and the resistor, a movable means connected to the governor for controlling the variable resistor for causing a reduction in the speed of the motor in accordance with an increase of speed of the drive shaft, and means for causing the motor to be connected to or disconnected from the drive shaft.

12. In a variable speed mechanism, a drive shaft, a driven shaft, a differential including a casing connecting said shafts, a motor for causing rotation of the casing at variable speeds relative to the drive shaft for causing relative speeds between the drive and driven shafts, a governor operated by the drive shaft, a movable means connected with the governor, and means controlled by the movable means for causing a decrease of speed of the motor when the speed of the drive shaft is increased.

13. In a variable speed mechanism, a drive shaft, a driven shaft, a differential including a casing connecting said shafts, a motor for causing rotation of the casing at variable speeds relative to the drive shaft for causing relative speeds between the drive and driven shafts, a governor operated by the drive shaft, an electric circuit including the motor, an arm actuated by the governor and means controlled by the actuation of the arm for varying the current to the motor for varying the speed of the casing relative to the drive shaft, and a manually operated switch cooperating with the movable arm for maintaining the circuit closed.

14. In a variable speed mechanism, a drive shaft and a driven shaft, a differential connecting said shafts, a casing enclosing the differential and connected therewith, an electric control motor, means operatively connecting the motor with the casing so that the casing may be revolved by the motor at a less speed than the driving shaft, means for causing a gradually decreasing speed of the motor and likewise the casing for causing a gradually increasing speed of the driven shaft, means included in the operative connections between the motor and casing for retaining the casing stationary when idle, and means including a second electric motor for causing the first-mentioned motor to be disconnected from or connected with the drive shaft.

15. In a variable speed mechanism, a drive shaft, a driven shaft, a differential connecting the drive shaft with the driven shaft, means for causing the differential to provide a variable speed between the drive shaft and the driven shaft, and including a casing housing said differential and connected to an element of the differential, an electric control motor, means operatively connecting the motor with the casing, means for causing the speed of the motor to decrease in accordance with an increase of speed of the drive shaft for causing the differential and casing to rotate the driven shaft from the drive shaft, an accelerator pedal, means actuated by said pedal for causing a decrease of speed of the motor and casing in advance of the action of the last-mentioned means.

16. In a variable speed mechanism, a drive shaft, a driven shaft, a differential connecting the drive shaft with the driven shaft, means for causing the differential to provide a variable speed between the drive shaft and the driven shaft, and including a casing housing said differential and connected to an element of the differential, an electric control motor, means operatively connecting the motor with the casing, means for causing the speed of the motor to decrease in accordance with an increase of speed of the drive shaft for causing the differential and casing to rotate the driven shaft from the drive shaft, a brake pedal, a switch actuated by the said pedal for closing a circuit to the control motor for increasing the speed of the motor and likewise the casing.

DAVID LOW.